United States Patent
Macken et al.

(10) Patent No.: US 9,934,807 B2
(45) Date of Patent: Apr. 3, 2018

(54) BOND PAD SHARING FOR POWERING MULTIPLE WRITERS OF A RECORDING HEAD

(71) Applicant: Seagate Technology LLC, Cupertino, CA (US)

(72) Inventors: Declan Macken, Eden Prairie, MN (US); Paul Sonda, Minneapolis, MN (US); Erik Hutchinson, Eden Prairie, MN (US); Jin Fang, Chaska, MN (US); John Wolf, Maple Grove, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/196,549

(22) Filed: Jun. 29, 2016

(65) Prior Publication Data

US 2018/0005656 A1    Jan. 4, 2018

(51) Int. Cl.
*G11B 5/60*    (2006.01)
*G11B 5/31*    (2006.01)
*G11B 5/024*    (2006.01)

(52) U.S. Cl.
CPC .......... *G11B 5/6076* (2013.01); *G11B 5/3133* (2013.01); *G11B 5/6011* (2013.01); *G11B 5/024* (2013.01)

(58) Field of Classification Search
CPC ..... G11B 5/607; G11B 5/6076; G11B 5/6011; G11B 20/10; G11B 27/36; G11B 5/024; G11B 5/3133; G11B 7/0948; G11B 7/12; G01K 13/00
See application file for complete search history.

(56) References Cited

U.S. PATENT DOCUMENTS

| | | | |
|---|---|---|---|
| 4,914,398 A | 4/1990 | Jove et al. | |
| 5,298,641 A | 3/1994 | Stewen | |
| 5,494,473 A | 2/1996 | Dupuis et al. | |
| 5,527,110 A | 6/1996 | Abraham et al. | |
| 5,559,429 A * | 9/1996 | Mowry ................. | G11B 5/39 324/699 |
| 5,610,783 A | 3/1997 | Maffitt et al. | |
| 5,712,747 A | 1/1998 | Voldman et al. | |
| 5,748,412 A | 5/1998 | Murdock et al. | |
| 5,768,068 A | 6/1998 | Eckberg et al. | |
| 5,850,374 A | 12/1998 | Abraham et al. | |
| 5,896,249 A | 4/1999 | Fontana, Jr. et al. | |

(Continued)

OTHER PUBLICATIONS

U.S. Appl. No. 15/414,234, filed Jan. 24, 2017, Ramakrishnan et al.

(Continued)

*Primary Examiner* — Brian Miller
(74) *Attorney, Agent, or Firm* — Hollingsworth Davis, LLC

(57) ABSTRACT

A magnetic recording head includes a plurality of writers and at least one reader. The plurality of writers and the reader define a plurality of close points of the head. The plurality of writers are spaced apart from one another in a cross-track direction and positioned in the same plane of the head. A plurality of contact sensors are positioned proximate the plurality of writers and the reader. The contact sensors are coupled together and to a pair of electrical bond pads of the head and configured to sense for head-disk contact at each of the close points.

20 Claims, 8 Drawing Sheets

(56) References Cited

U.S. PATENT DOCUMENTS

| | | | |
|---|---|---|---|
| 6,034,849 A | 3/2000 | Takizawa | |
| 6,052,249 A | 4/2000 | Abraham | |
| 6,347,983 B1 | 2/2002 | Hao et al. | |
| 6,396,667 B1 | 5/2002 | Zhang et al. | |
| 6,623,330 B2 | 9/2003 | Fukuroi | |
| 6,700,724 B2 * | 3/2004 | Riddering | G11B 5/581 360/69 |
| 6,813,118 B2 | 11/2004 | Pust et al. | |
| 7,042,683 B1 * | 5/2006 | Cross | G11B 5/3166 360/319 |
| 7,068,457 B2 * | 6/2006 | Riddering | G11B 5/6005 360/75 |
| 7,088,543 B2 | 8/2006 | Satoh et al. | |
| 7,119,990 B2 | 10/2006 | Bajorek et al. | |
| 7,133,254 B2 | 11/2006 | Hamann et al. | |
| 7,362,534 B1 | 4/2008 | Schreck et al. | |
| 7,446,977 B2 | 11/2008 | Nikitin et al. | |
| 7,466,516 B2 | 12/2008 | Lille | |
| 7,509,728 B1 * | 3/2009 | Schreck | G11B 5/3133 29/603.03 |
| 7,511,906 B2 * | 3/2009 | Iwase | G11B 5/6005 360/31 |
| 7,551,406 B1 | 6/2009 | Thomas et al. | |
| 7,589,936 B1 | 9/2009 | McFadyen et al. | |
| 7,643,250 B2 | 1/2010 | Araki et al. | |
| 7,782,568 B2 | 8/2010 | Shiraki et al. | |
| 7,936,538 B1 | 5/2011 | Zhang et al. | |
| 7,969,687 B2 | 6/2011 | Lee et al. | |
| 8,098,450 B2 | 1/2012 | Baumgart et al. | |
| 8,149,541 B2 * | 4/2012 | Baumgart | G11B 5/6005 360/234.5 |
| 8,159,780 B2 | 4/2012 | Brand | |
| 8,169,751 B2 | 5/2012 | Albrecht et al. | |
| 8,297,113 B2 | 10/2012 | Liners et al. | |
| 8,310,779 B2 | 11/2012 | Hanchi | |
| 8,400,736 B2 | 3/2013 | Greminger et al. | |
| 8,432,636 B2 | 4/2013 | Brand | |
| 8,804,272 B1 | 8/2014 | Dakroub et al. | |
| 8,879,189 B2 | 11/2014 | Miyamoto et al. | |
| 8,937,791 B1 | 1/2015 | Olson et al. | |
| 8,947,807 B2 | 2/2015 | Heim et al. | |
| 8,953,275 B2 | 2/2015 | Chou et al. | |
| 9,036,290 B2 * | 5/2015 | Johnson | G11B 5/607 360/75 |
| 9,111,572 B2 | 8/2015 | Kunkel et al. | |
| 9,437,234 B1 * | 9/2016 | Kim | G11B 5/3136 |
| 9,542,963 B2 * | 1/2017 | Zang | G11B 5/6011 |
| 9,607,640 B2 | 3/2017 | MacKen et al. | |
| 9,607,641 B1 | 3/2017 | Ramakrishnan et al. | |
| 2005/0024775 A1 | 2/2005 | Kurita et al. | |
| 2005/0190495 A1 | 9/2005 | Lille | |
| 2006/0056110 A1 | 3/2006 | Kato et al. | |
| 2006/0203387 A1 | 9/2006 | White et al. | |
| 2007/0035881 A1 | 5/2007 | Burbank et al. | |
| 2007/0230056 A1 | 10/2007 | Beach et al. | |
| 2007/0274005 A1 | 11/2007 | Zhu et al. | |
| 2009/0040645 A1 | 2/2009 | Shimazawa et al. | |
| 2009/0052076 A1 | 2/2009 | Shimazawa et al. | |
| 2009/0052077 A1 | 2/2009 | Tanaka et al. | |
| 2009/0195930 A1 | 8/2009 | Lille | |
| 2009/0251821 A1 | 10/2009 | Song et al. | |
| 2009/0262460 A1 | 10/2009 | Hanchi | |
| 2010/0226044 A1 | 9/2010 | Iwase | |
| 2011/0013316 A1 | 1/2011 | Brand | |
| 2011/0019311 A1 | 1/2011 | Greminger et al. | |
| 2011/0248167 A1 | 10/2011 | Gurvitch et al. | |
| 2012/0113207 A1 | 5/2012 | Zheng | |
| 2012/0120519 A1 | 5/2012 | Kunkel et al. | |
| 2012/0120522 A1 | 5/2012 | Johnson et al. | |
| 2012/0120527 A1 | 5/2012 | Kunkel et al. | |
| 2012/0327529 A1 | 12/2012 | Hutchinson et al. | |
| 2013/0188273 A1 | 7/2013 | Miyamoto et al. | |
| 2014/0177083 A1 | 6/2014 | Heim et al. | |
| 2014/0269838 A1 | 9/2014 | Macken | |
| 2015/0103430 A1 | 4/2015 | Gadbois et al. | |
| 2015/0380021 A1 | 12/2015 | Kunkel et al. | |
| 2016/0365106 A1 * | 12/2016 | Kojima | G11B 5/607 |

OTHER PUBLICATIONS

U.S. Appl. No. 15/415,165, filed Jan. 25, 2017, Ramakrishnan et al.
File History for U.S. Appl. No. 15/007,756 dated Feb. 24, 2017, 105 pages.

* cited by examiner

BOND PAD SHARING FOR POWERING MULTIPLE WRITERS OF A RECORDING HEAD

SUMMARY

Various embodiments are directed to an apparatus which includes a plurality of writers and at least one reader of a magnetic recording head. The plurality of writers and the reader define a plurality of close points of the head. The plurality of writers are spaced apart from one another in a cross-track direction and positioned in the same plane of the head. A plurality of contact sensors are positioned proximate the plurality of writers and the reader. The contact sensors are coupled together and to a pair of electrical bond pads of the head and configured to sense for head-disk contact at each of the close points.

According to other embodiments, an apparatus includes a slider configured to interact with a magnetic recording medium. The slider comprises a plurality of electrical bond pads. A first writer is disposed at a first close point of the slider. A second writer is disposed at a second close point of the slider. The first and second writers are spaced apart from one another in a cross-track direction and positioned in the same plane of the slider. A reader is disposed at a third close point of the slider. The slider includes three contact sensors configured to sense for contact between the slider and the medium. A first contact sensor is situated at or near the first close point of the first writer, the second contact sensor is situated at or near the second close point of the second writer, and the third contact sensor is situated at or near the third close point of the reader. The three contact sensors are coupled together and between a pair of the bond pads.

The above summary is not intended to describe each disclosed embodiment or every implementation of the present disclosure. The figures and the detailed description below more particularly exemplify illustrative embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
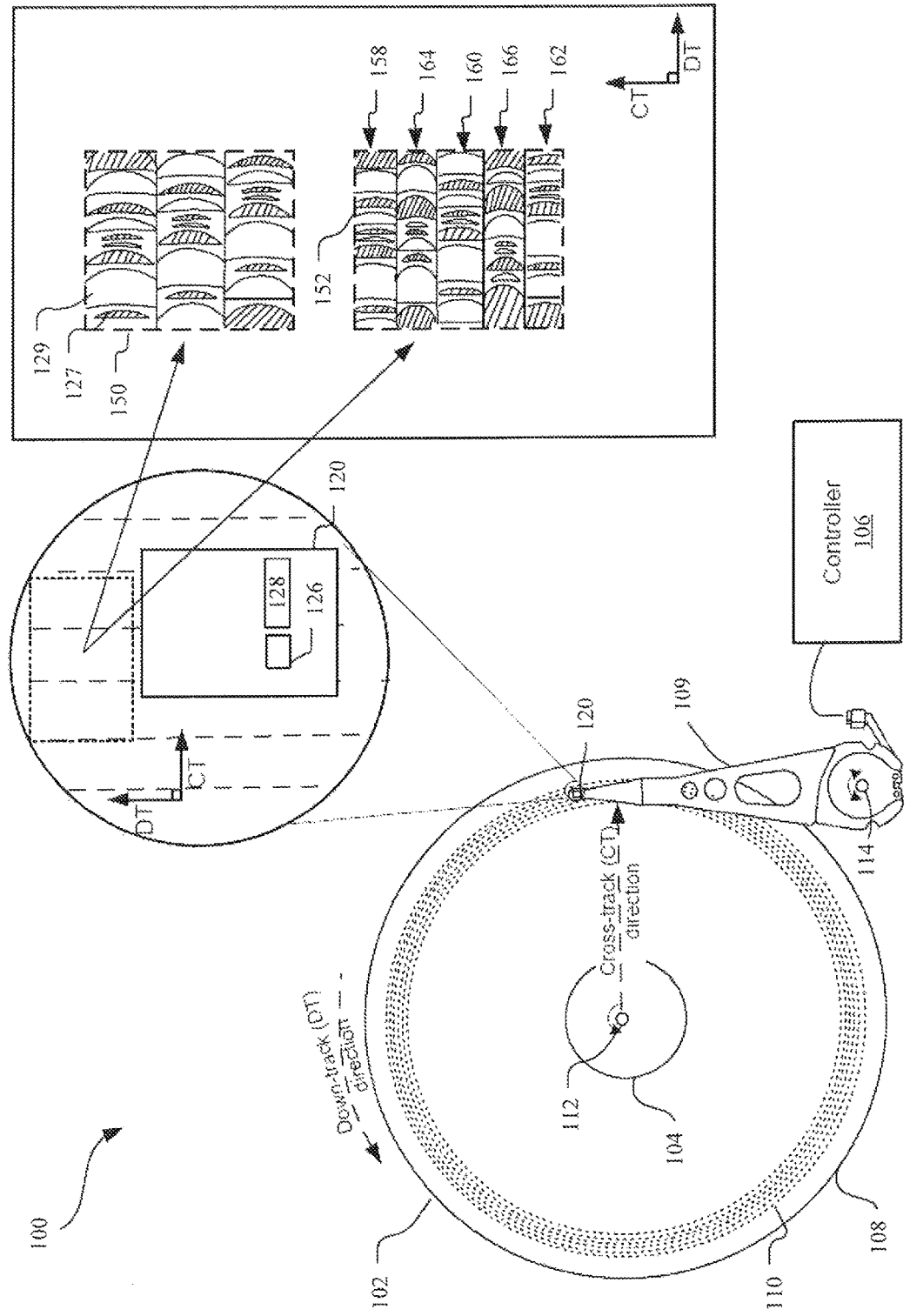
FIGS. 1A, 1B, and 1C illustrate a magnetic recording head positioned relative to a magnetic recording medium and configured for interlaced magnetic recording (IMR) in accordance with various embodiments, the recording head including a multiplicity of contact sensors for sensing contact at a multiplicity of close points of the recording head.

Data storage systems commonly include one or more transducers that write and read information to and from a magnetic storage medium. A recording transducer, for example, incorporates several distinct electrical components that require specified voltages/currents to operate properly. Representative examples of such electrical transducer components include one or more readers, one or more reader heaters, one or more writers, and one or more writer heaters, among other possible components. Some recording transducers incorporate one or more sensors, such as contact sensors, each requiring specified operating voltages/currents. Each of the electrically activated components of a transducer is electrically coupled to corresponding electrical contacts or bond pads of the transducer. Depending on the particular design of a given transducer, various bond pads can be configured as voltage sources, current sources, and ground contacts, and can also send and receive signals (e.g., write signals, readback signals, sensor signals, control signals). Because bond pads take up appreciable space on a transducer and adding bond pads can be very expensive due to changes in design and fabrication processes needed to accommodate such additional bond pads, it is desirable to minimize both the number of bond pads and changes to the bond pad configuration of a transducer.

An issue with adding additional components or any electrical feature in general to an existing slider or HGA is the real estate required to place bond pads which allow access to these new features. Some slider form factors, for example, can accommodate nine bond pads. In other sliders, a total of ten bond pads is likely feasible. Any increase in bond pad count above nine or ten (depending on the slider/HGA design) likely requires migration to a top bond pad configuration, which is both more technically challenging and expensive. An alternative to adding an additional bond pad above the designed-in pad count is to share an existing bond pad between two or more electrical devices on the slider.

Sharing a common bond pad between two or more electrical components (e.g., readers) can raises the issue of bias contention as well as degraded performance (e.g., degraded common mode rejection). Such issues can be addressed by addition or modification of biasing and filtering circuitry, although this approach adds some degree of complexity to the design. An alternative and simpler approach involves pad sharing between electrical components having the same or similar biasing and/or filtering requirements. Another example of this approach involves a bond pad shared between electrical components that operate at different times or can be operated alternately.

Sharing of electrical bond pads is important for magnetic recording heads configured for interlaced magnetic recording, also referred to as interleaved magnetic recording. Recording heads configured for IMR include two writers in addition to one or more readers. One of the writers is wide and the other writer is narrow. Each of the two writers has an associated writer heater. The addition of a second writer and a second heater for thermally actuating the second writer increases the demand for additional bond pads. Each of the writers and the one or more readers of a recording head defines a close point of the head when active. A close point represents the closest point of the head relative to the surface of a magnetic recording medium. In the case of IMR, for example, when the wide writer is active, activation of the wide writer's heater causes local protrusion of the head making the wide writer the close point of the head. When the narrow writer is active, activation of the narrow writer's heater causes local protrusion of the head making the narrow writer the close point of the head. When the reader is active, activation of the reader's heater causes protrusion of the head making the reader the close point of the head.

In a multiple-writer/reader recording head, it is desirable to detect spacing changes and head-medium contact at each of the close points of the recording head. For example, it would be desirable to situate a contact sensor at each of the close points. The addition of contact sensors to account for each close point increases the demand for additional bond pads needed to support the additional contact sensors. Embodiments are directed to bond pad sharing of multiple contact sensors for recording heads that incorporate multiple writers and one or more readers. Embodiments are directed to bond pad sharing of multiple contact sensors for recording heads configured for IMR.

FIGS. 1A, 1B, and 1C illustrate a data storage device 100 including a recording head 120 for writing data on a magnetic storage medium 108 in accordance with an interlaced magnetic recording methodology. The recording head 120 can be implemented to include a multiplicity of contact sensors in accordance with the various embodiments disclosed herein. As illustrated in FIG. 1A, the storage medium 108 rotates about a spindle center or a disk axis of rotation 112 during rotation, and includes an inner diameter 104 and an outer diameter 102 between which are a number of concentric data tracks 110. Information may be written to and read from data bit locations in the data tracks on the storage medium 108. A recording head 120 is mounted on an actuator assembly 109 at an end distal to an actuator axis of rotation 114. The recording head 120 flies in close proximity above the surface of the storage medium 108 during disk rotation. A seek operation positions the recording head 120 over a target data track for read and write operations.

Referring to FIG. 1B, the recording head 120 includes two different writers 126 and 128, also referred to as write elements. The writers 126 and 128 are shown to be in alignment in the cross-track direction; however, other write element configurations are contemplated for use in other implementations. Each of the writers 126 and 128 includes a write pole (not shown) that converts a series of electrical pulses sent from a controller 106 into a series of magnetic pulses of commensurate magnitude and length, and the magnetic pulses selectively magnetize magnetic grains of the rotating magnetic media 108 as they pass below the write element 126 or 128.

FIG. 1C illustrates magnified views 150 and 152 of a same surface portion of the storage media 108 according to different write methodologies and settings of the storage device 100. Specifically, the magnified views 150 and 152 include a number of magnetically polarized regions, also referred to herein as "data bits," along the data tracks of the storage media 108. Each of the data bits (e.g., a data bit 127) represents one or more individual data bits of a same state (e.g., 1 s or 0 s). For example, the data bit 129 is a magnetically polarized region representing multiple bits of a first state (e.g., "000"), while the adjacent data bit 127 is an oppositely polarized region representing one or more bits of a second state (e.g., a single "1"). The data bits in each of the magnified views 150, 152 are not necessarily illustrative of the actual shapes or separations of the bits within an individual system configuration.

The magnified view 150 in FIG. 1C illustrates magnetic transitions recorded according to a conventional magnetic recording (CMR) technique. In a CMR system, all written data tracks are randomly writeable and of substantially equal width. A random write refers to a write operation to a first data track that does not critically impair (e.g., corrupt or erase) data on either adjacent track. According to one implementation, the recorded data bits of the magnified view 150 are recorded with a same write element (e.g., either the write element 126 or 128) of the recording head 120.

In a CMR system, an achievable linear density (e.g., density along an individual data track) is limited by the size of the write element used to write the data encoded on the storage medium 108. For example, the data bit 127 may represent the smallest data bit recordable by a particular write element. Likewise, a read element (not shown) may have difficulty deciphering the data recorded on the media 108 if the various polarized regions are too small or placed too close to one another.

The magnified view 152 in FIG. 1C illustrates data bits recorded according to another set of system parameters implementing an interlaced magnetic recording technique. According to one implementation, this IMR technique provides for a higher total areal density capability (ADC) with a lower observable bit error rate (BER) than conventional recording systems.

Specifically, the magnified view 152 illustrates alternating data tracks of different track widths and different linear densities. The write element 128 is used to write a first grouping of alternating data tracks (e.g., data tracks 158, 160, and 162) with a wide written track width, while the write element 126 is used to write a second grouping of interlaced data tracks (e.g., the data tracks 164, 166) with a narrower written track width. Data of the narrow, interlaced data tracks overwrites edges of adjacent and previously written data tracks of the wider width.

For example, writing of the data track 164 overwrites data on the adjacent edges of the data tracks 158 and 160. In other words, a defined track pitch (e.g., radial spacing between centers of two directly adjacent data tracks) is by design less than the write width of the wide write element 128 but greater than or approximately equal to the write width of the narrow write element 126.

In another implementation, the first grouping of data tracks (e.g., the data tracks 158, 160, and 162) includes data of a higher linear density than the interlaced tracks (e.g., the data tracks 164 and 166). Other implementations of the disclosed technology may provide for data tracks of three or more different written track widths and/or three or more different linear densities on a same surface of the magnetic storage medium 108.

To generate the IMR pattern shown in magnified view 152, a storage controller 106 of the storage device 100 alters one or more system parameters (e.g., write current, overshoot, waveform, etc.) based on a discrete write location where data is received and stored on the storage medium 108. For example, the storage controller 106 may write even-numbered data tracks on the storage medium 108 with a first linear density and track width and write odd-numbered data tracks on the magnetic media with a second linear density and different track width.

In one implementation, the storage medium 108 is divided radially into zones and each zone is associated with multiple linear densities. For example, two different linear densities may be used to write data of alternating tracks within each individual radial zone. The linear densities used in one radial zone may differ from the linear densities used in any other radial zone of the storage medium 108.

Further, the controller 106 may be configured to systematically direct incoming write commands to different data tracks of the storage medium according to a number of prioritized random access (PRA) rules. For example, the controller 106 selects storage locations for each incoming write command to systematically maximize a total number of possible random writes.

In general, PRA rules dictate an order in which two or more data tracks on the magnetic storage medium 108 are to be written. For example, a PRA rule may specify that a particular data track (center data track) is to be written before either of the data tracks adjacent to the particular data track. In this case, the particular data track is randomly writable if the adjacent data tracks do not contain any data. If however, data is already stored on either of the adjacent data tracks, the data write to the particular data track may include: (1) caching the data on one or both of the adjacent data tracks; (2) writing the particular track; and (3) subsequently, re-writing the data of one or both of the adjacent data tracks. Embodiments that use IMR when writing data can be implemented according to the embodiments disclosed in commonly-owned, co-pending U.S. patent application Ser. No. 14/686,456, filed on Apr. 14, 2015, which claims benefit of priority to U.S. Provisional Application No. 62/083,696, filed on Nov. 24, 2014, and also to commonly-owned, co-pending U.S. patent application Ser. No. 14/686, 561, filed on Apr. 14, 2015, which claims benefit of priority to U.S. Provisional Patent Application No. 62/083,732, filed on Nov. 24, 2014, all of which are hereby incorporated herein by reference.

Various embodiments of bond pad sharing by a multiplicity of contact sensors for magnetic recording heads having a multiplicity of close points (e.g., ≥3) will now be described in greater detail. In general, embodiments of the disclosure are directed to slider configurations that facilitate bond pad sharing between multiple contact sensors for recording heads configured for IMR. It is understood that the interconnected contact sensor arrangements disclosed herein can be implemented in any recording head that includes three or more close points.

Figure 2:
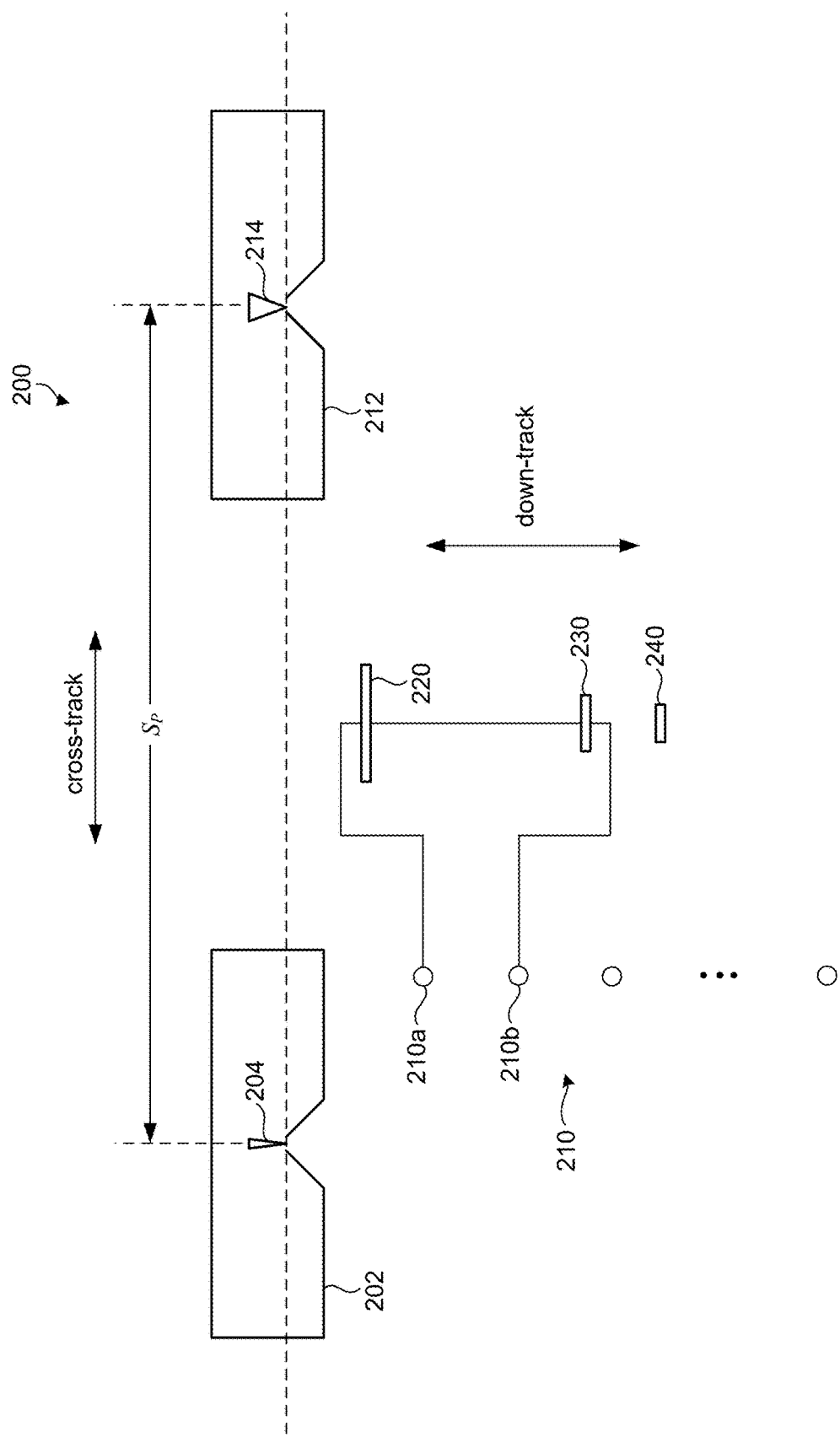
FIG. 2 is an illustration of various components of a magnetic recording head configured for IMR in accordance with various embodiments, the recording head including a multiplicity of contact sensors for sensing contact at a multiplicity of close points of the recording head.

FIG. 2 is an illustration of various components of a magnetic recording head 200 configured for interlaced magnetic recording in accordance with various embodiments. The portion of the recording head 200 shown in FIG. 2 includes a first writer 202 and a second writer 212 spaced apart from one another in a cross-track direction. In the embodiment shown in FIG. 2, the first writer 202 includes a narrow write pole 204, and the second writer 212 includes a wide write pole 214. The narrow and wide write poles 204 and 214 are spaced apart in a cross-track direction by a distance, $S_P$, which can range between about 15 and 25 μm (e.g., about 20 μm). According to various embodiments, the narrow and wide write poles 202 and 214 are positioned in the same plane (are coplanar) of the recording head 200.

The recording head 200 shown in FIG. 2 also includes a reader 240 spaced apart from the first and second writers 202 and 212 in a down-track direction. The reader 240 can be positioned between (e.g., equidistant) the first and second writers 202 and 212. A reader contact sensor 230 is positioned proximate the reader 240. The recording head 200 includes three close points. The first writer 202, when active, defines a first close point of the recording head 200. The second writer 212, when active, defines a second close point of the recording head 200. The reader 240, when active, defines a third close point of the recording head 200. It is noted that each of the first writer 202, second writer 212, and reader 240 is thermally actuated by a respective heater (not shown), and that the heaters can be connected to bond pads 210 of the recording head 200 using a bond sharing connection strategy.

In the embodiment shown in FIG. 2, the recording head 200 includes a multiplicity of contact sensors positioned proximate the first and second writers 202 and 212 and the reader 240. The multiplicity of contact sensors are configured to sense for head-disk contact and spacing changes at each of the three close points of the recording head 200. In the embodiment shown in FIG. 2, two contact sensors 220 and 230 are configured to sense for head-disk contact and spacing changes at each of the three close points of the recording head 200.

A writer contact sensor 220 is positioned between the first writer 202 and the second writer 212. More particularly, the writer contact sensor 220 can be positioned equidistant between the first and second writers 202 and 212. As shown, the writer contact sensor 220 is positioned down track of the plane (see dashed line) at which the narrow and wide write poles 202 and 214 are situated. It is preferable that the writer contact sensor 220 be positioned as close as possible to the plane of the narrow and wide write poles 202 and 214. Although the writer contact sensor 220 is shown spaced apart (e.g., 8-12 μm) from the narrow and wide write poles 204 and 214 in FIG. 2, the writer contact sensor 220 is situated in close proximity (e.g., 1-5 μm) to thermally conductive structures of the first and second writers 202 and 212. As such, the writer contact sensor 220 is sensitive to changes in temperature occurring at the close points associated with the first writer 202 and the second writer 212. Accordingly, the writer contact sensor 220 serves as a common contact sensor to both the first and second writers 202 and 212.

The writer and reader contact sensors 220 and 230 can be implemented as a resistive sensor, such as a resistive temperature sensor (e.g., TCR sensor), for example. As shown, the contact sensor is implemented as a DETCR (dual-ended TCR sensor). The contact sensors 220 and 230 can be implemented using other technologies, such as a thermocouple or a thermistor. Using a connection strategy that does not employ bond pad sharing, each of the contact sensors 220 and 230 would be connected to a respective pair of bond pads 210. Using this approach, the contact sensors 220 and 230 would require a total of four bond pads 210. According to some bond pad sharing embodiments, the writer contact sensor 220 and the reader contact sensor 230 are coupled together and to a pair of electrical bond pads 210a and 210b of the recording head 200. In FIG. 2, the writer contact sensor 220 and the reader contact sensor 230 are connected in series to bond pad 210a and bond pad 210b, resulting in freeing up (or eliminating) two bond pads relative to a non-bond pad sharing connection strategy. It is noted that, in some embodiments, the writer contact sensor 220 and the reader contact sensor 230 can be connected in parallel between bond pads 210a and 210b.

Figure 3:
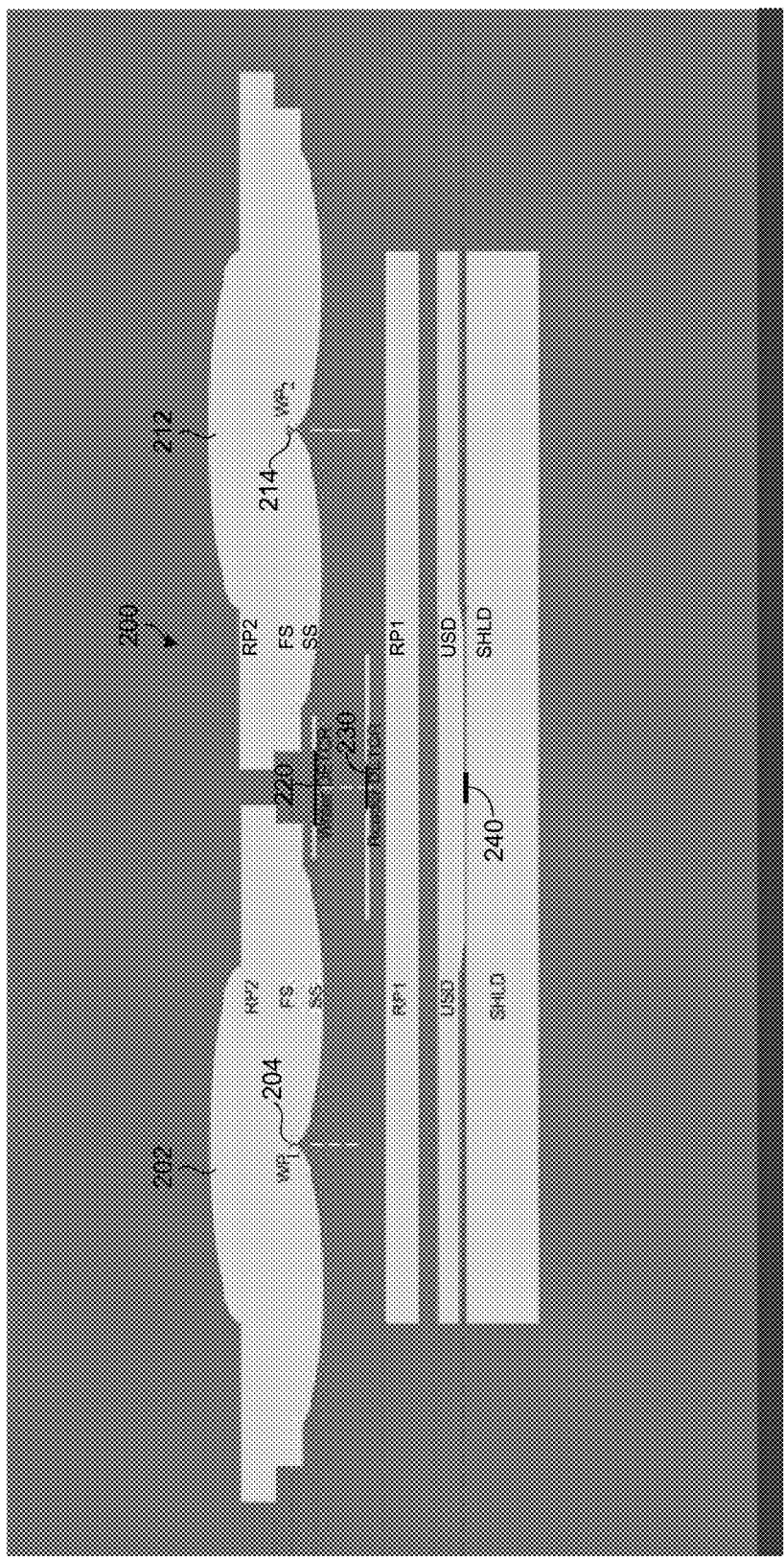
FIG. 3 shows the embodiment of FIG. 2 illustrated in layered structures of a recording head in accordance with various embodiments.

FIG. 3 shows the embodiment of FIG. 2 illustrated in layered structures of a recording head in accordance with various embodiments. In FIG. 3, a first writer 202 is shown spaced apart in a cross-track direction from a second writer 212. A narrow write pole 204 of the first writer 202 is shown situated in the same plane of the recording head 200 as a wide write pole 214 of the second writer 212. The first and second writers 202 and 214 include a first return pole (RP1—shared in this configuration) and a second return pole (RP2). Each of the first and second writers 202 and 214 also includes a front shield (FS) and a side shield (SS). A writer contact sensor 220 is situated near a gap between opposing front and side shields (FS and SS) of the first and second writers 202 and 212.

It can be seen in FIG. 3 that the writer contact sensor 220 is in close proximity (e.g., 1-5 μm) to the side shield (SS) and/or front shield (FS) of the first and second writers 202 and 212. As such, heat produced by contact between the recording head 200 and the surface of a magnetic recording medium (head-medium or head-disk contact) that occurs when either the first or second writer 202 and 212 is active can be detected by the writer contact sensor 220. More particularly, when the first writer 202 is active and the second writer 212 is inactive, the region of the recording head 200 around the first writer 202 protrudes to define a first close point. Temperature changes at the first close point due to head-disk contact and spacing changes are conducted along the front and/or side shields (FS and SS) of the first writer 202 and sensed by the writer contact sensor 220. Similarly, when the second writer 212 is active and the first writer 202 is inactive, the region of the recording head 200 around the second writer 212 protrudes to define a second close point. Temperature changes at the second close point due to head-disk contact and spacing changes are conducted along the front and/or side shields (FS and SS) of the second writer 212 and sensed by the writer contact sensor 220. In this manner, a single writer contact sensor 220 can serve as a contact sensor for two close points (e.g., first and second writers 202 and 212) of the recording head 200.

FIG. 3 also shows a reader 240 positioned between a first shield (USD) and a second shield (SHLD). A reader contact sensor 230 is positioned proximate the reader 240. When the reader 240 is active and the first and second writers 202 and 212 are inactive, the region of the recording head 200 around the reader 240 protrudes to define a third close point. Temperature changes at the third close point due to head-disk contact and spacing changes are sensed by the reader contact sensor 230. As such, the writer and reader contact sensors 220 and 240 are arranged to sense for spacing changes and head-disk contact for three close points of the recording head 200. It is noted that at least one of the writer contact sensor 220 and the reader contact sensor 230 can be configured to detect thermal asperities in addition to head-disk contact and spacing changes. For example, the reader contact sensor 230 can be configured to detect thermal asperities in addition to head-disk contact and spacing changes.

Figure 4:
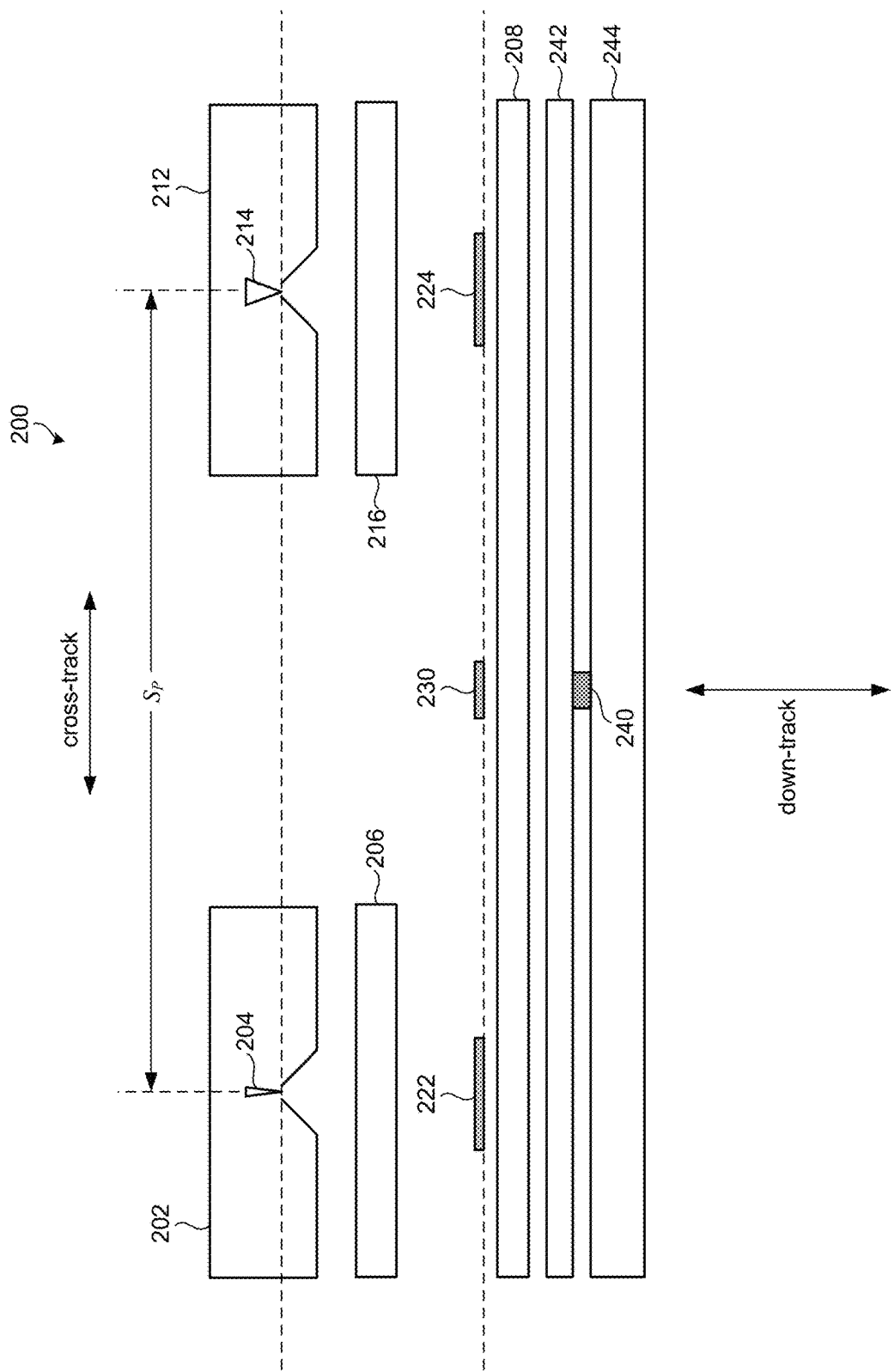
FIG. 4 is an illustration of various components of a magnetic recording head configured for IMR in accordance with some embodiments, the recording head including a multiplicity of contact sensors for sensing contact at a multiplicity of close points of the recording head.

FIG. 4 is an illustration of various components of a magnetic recording head 200 configured for interlaced magnetic recording in accordance with various embodiments. The portion of the recording head 200 shown in FIG. 4 includes a first writer 202 and a second writer 212 spaced apart from one another in a cross-track direction. The first writer 202 includes a narrow write pole 204, a coil 206, and a first return pole 208. The second writer 212 includes a wide write pole 214, a coil 216, and a first return pole 208, which is shared with the first writer 202. The narrow and wide write poles 204 and 214 are spaced apart in a cross-track direction by a distance, $S_P$, which can range between about 15 and 25 μm (e.g., about 20 μm). According to various embodiments, the narrow and wide write poles 202 and 214 are positioned in the same plane of the recording head 200.

Figure 4A:
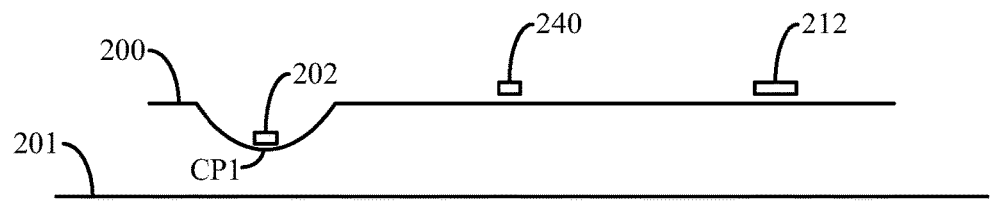
FIGS. 4A, 4B, and 4C illustrate three close points of the magnetic recording head shown in FIG. 4.
Figure 4B:
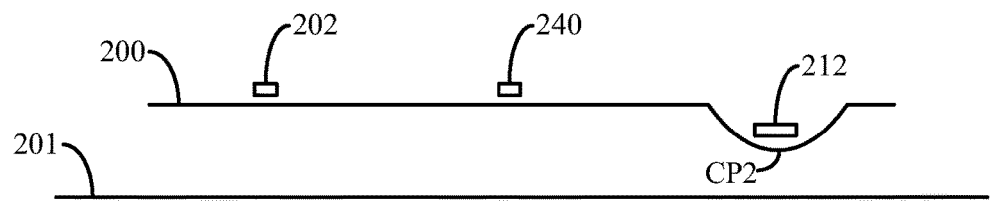
Figure 4C:
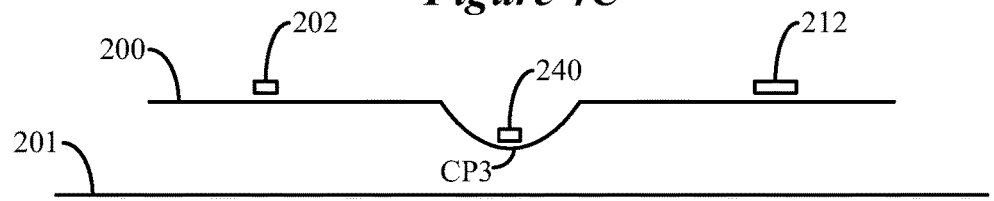

The recording head 200 shown in FIG. 4 also includes a reader 240 spaced apart from the first and second writers 202 and 212 in a down-track direction. The reader 240 can be positioned between (e.g., equidistant) the first and second writers 202 and 212. The reader 240 is positioned between reader shields 242 and 244. The recording head 200 includes three close points, CP1, CP2, and CP3, between the slider 200 and recording medium 201, as is shown in FIGS. 4A, 4B, and 4C, respectively. The first writer 202, when active, defines a first close point, CP1, of the recording head 200. The second writer 212, when active, defines a second close point, CP2, of the recording head 200. The reader 240, when active, defines a third close point, CP3, of the recording head 200.

In the embodiment shown in FIG. 4, the recording head 200 includes three contact sensors 222, 224, and 230. A first contact sensor 222 is positioned at or near the first close point proximate the first writer 202. A second contact sensor 224 is positioned at or near the second close point proximate the second writer 212. A third contact sensor 230 is positioned at or near the third close point proximate the reader 240. The first contact sensor 222 is shown positioned between the first coil 206 and the first return pole 208. The second contact sensor 224 is shown positioned between the second coil 216 and the first return pole 208. The third contact sensor 230 is shown positioned between the first and second writers 202 and 212 and between the first return pole 208 and the first and second coils 206 and 216. The first and second contact sensors 222 and 224 are spaced apart in a cross-track direction by a distance, $S_P$, which can range between about 15 and 25 μm (e.g., about 20 μm). The third contact sensor 230 can be spaced apart in a cross-track direction from the first and second contact sensors 222 and 224 by a distance of between about 8 and 13 μm (e.g., about 10 μm). In the embodiment shown in FIG. 4, the three contact sensors 222, 224, and 230 are positioned along the same plane (are coplanar) of the recording head 200.

In the embodiment shown in FIG. 4, the first and second contact sensors 222 and 224 associate with the first and second writers 202 and 212 are configured to detect head-disk contact and spacing changes. The third contact sensor 230 is smaller in size than the first and second contact sensors 222 and 224, and is configured for sensing thermal asperities in addition to head-disk contact and spacing changes. For example, the first and second contact sensors 222 and 224 can have a length of about 2 μm and a width of about 175 nm. The third contact sensor 230 can have a length of about 750 nm and a width of about 85 nm.

Figure 5:
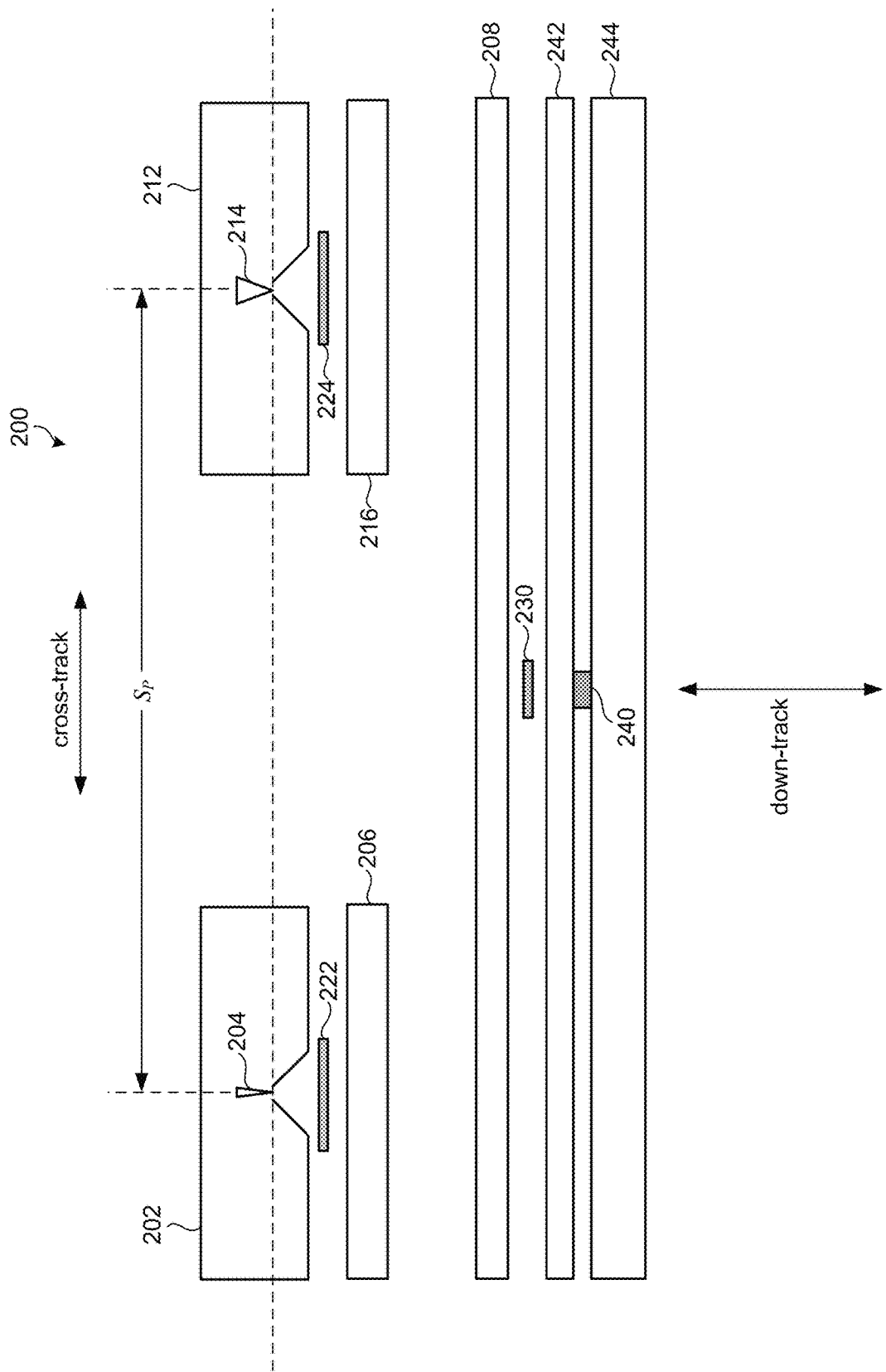
FIG. 5 is an illustration of various components of a magnetic recording head configured for IMR in accordance with other embodiments, the recording head including a multiplicity of contact sensors for sensing contact at a multiplicity of close points of the recording head.

FIG. 5 is an illustration of various components of a magnetic recording head 200 configured for interlaced magnetic recording in accordance with other embodiments. The portion of the recording head 200 shown in FIG. 5 includes the same components as the recording head 200 shown in FIG. 4, with like numbers used in FIGS. 4 and 5 referring to like components. The embodiment shown in FIG. 5 differs from that of FIG. 4 in that the positions of the contact sensors differ. In the embodiment shown in FIG. 5, the first contact sensor 222 is positioned between the narrow write pole 204 of the first writer 202 and the first coil 206. The second contact sensor 224 is positioned between the wide write pole 214 of the second writer 212 and the second coil 216. The third contact sensor 230 is shown positioned between the first and second writers 202 and 212 and between the first return pole 208 and the reader shield 242.

It can be seen in FIG. 5 that the three contact sensors 222, 224, and 230 are not aligned along the same plane (e.g., are not coplanar), as is the case in the embodiment shown in FIG. 4. It is noted that the first and second contact sensors 222 and 224 can be aligned along the same plane (e.g., are coplanar), as is shown in FIG. 5. In comparison to the embodiment shown in FIG. 4, the first and second contact sensors 222 and 224 are closer to the first and second writers 202 and 212 (closer to the write poles 204 and 214). For example, the first contact sensor 222 can be spaced apart from the narrow write pole 204 by about 1 µm to 250 nm. The second contact sensor 224 can be spaced apart from the wide write pole 214 by about 1 µm to 250 nm. As such, the first and second contact sensors 222 and 224 are highly sensitive to temperature changes at the first and second close points of the recording head 200.

FIGS. 6-9 are electrical wiring diagrams illustrating different bond pad sharing connection strategies for connecting a multiplicity of contact sensors to a pair of electrical bond pads of a recording head in accordance with various embodiments. In FIGS. 6-9, three contact sensors, $CS_{W1}$, $CS_{W2}$, and $CS_R$, are shown as resistors for simplicity of illustration. The contact sensor $CS_{W1}$ can correspond to the first contact sensor 222 associated with the first writer 202 shown in FIGS. 4 and 5. The contact sensor $CS_{W2}$ can correspond to the second contact sensor 224 associated with the second writer 212 shown in FIGS. 4 and 5. The contact sensor $CS_R$ can correspond to the third contact sensor 230 associated with the reader 240 shown in FIGS. 4 and 5. According to some embodiments, the three contact sensors, $CS_{W1}$, $CS_{W2}$, and $CS_R$, are implemented as DETCRs As was discussed previously, a conventional wiring approach (e.g., a non-bond sharing connection strategy) for connecting a single DETCR requires two bond pads. As such, a conventional wiring approach for connecting three DETCRs, $CS_{W1}$, $CS_{W2}$, and $CS_R$, would require a total of six bond pads. The DETCR connection strategy shown in FIGS. 6-9 provides for connecting three DETCRs, $CS_{W1}$, $CS_{W2}$, and $CS_R$, using only to bond pads, thereby freeing up four pads for other components (or for elimination).

Figure 6:
FIGS. 6-9 are electrical wiring diagrams illustrating different bond pad sharing connection strategies for connecting a multiplicity of contact sensors to a pair of electrical bond pads of a recording head in accordance with various embodiments.

FIG. 6 illustrates an embodiment in which the three contact sensors, $CS_{W1}$, $CS_{W2}$, and $CS_R$, are connected in series between a first bond pad 210a and a second bond pad 210b. Given the series connection approach shown in FIG. 6, current through the three contact sensors, $CS_{W1}$, $CS_{W2}$, and $CS_R$, is the same and the voltage drop across each of the sensors, $CS_{W1}$, $CS_{W2}$, and $CS_R$, depends on the resistance of each sensor. In some embodiments, the reader contact sensor, $CS_R$, is designed to have higher resistance (e.g., about 100 to 25 Ohms) relative to that of the writer contact sensors, $CS_{W1}$ and $CS_{W2}$ (e.g., about 90 to 15 Ohms). In FIG. 6, the voltage requirements of the preamplifier are relatively high due to the series connection strategy used to connect the three contact sensors, $CS_{W1}$, $CS_{W2}$, and $CS_R$, to the first and second bond pads 210a and 210b.

Figure 7:
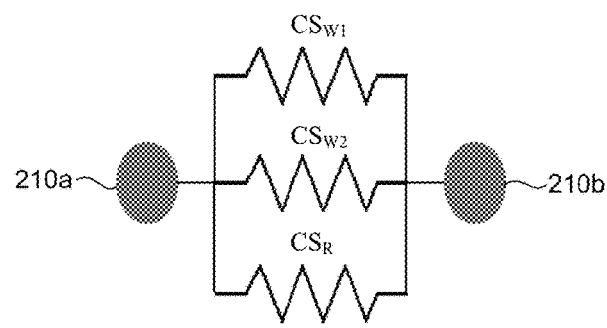

FIG. 7 illustrates an embodiment in which the three contact sensors, $CS_{W1}$, $CS_{W2}$, and $CS_R$, are connected in parallel between the first bond pad 210a and the second bond pad 210b. Given the parallel connection approach shown in FIG. 7, the voltage across the three sensors, $CS_{W1}$, $CS_{W2}$, and $CS_R$, is the same and the current through each of the sensors, $CS_{W1}$, $CS_{W2}$, and $CS_R$, depends on the resistance of each sensor. In FIG. 7, the current requirements of the preamplifier are relatively high due to the parallel connection strategy used to connect the three contact sensors, $CS_{W1}$, $CS_{W2}$, and $CS_R$, to the first and second bond pads 210a and 210b.

Figure 8:
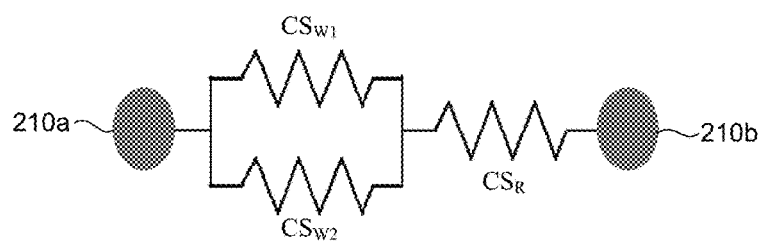
Figure 9:
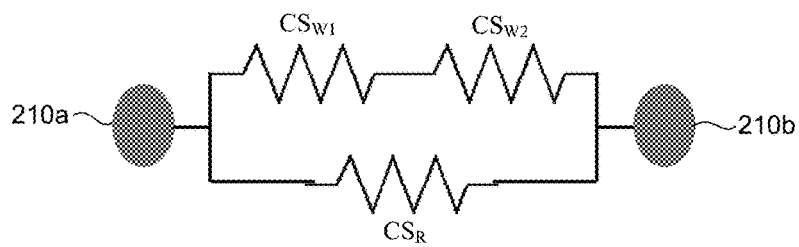

FIGS. 8 and 9 illustrate contact sensor connection strategies that offer a compromise between the high-voltage and high current connection approaches shown in FIGS. 6 and 7, respectively. In FIG. 8, the first contact sensor $CS_{W1}$ and the second contact sensor $CS_{W2}$ are connected in parallel. The parallel-connected first and second contact sensors $CS_{W1}$ and $CS_{W2}$ are connected in series with the third contact sensor $CS_R$. The parallel-connected first and second contact sensors $CS_{W1}$ and $CS_{W2}$ are connected are connected to the first bond pad 210a and the third contact sensor $CS_R$ is connected to the second bond pad 210b.

In FIG. 9, the first and second contact sensors $CS_{W1}$ and $CS_{W2}$ are connected in series. The series-connected first and second contact sensors $CS_{W1}$ and $CS_{W2}$ are connected in parallel with the third contact sensor $CS_R$. The first contact sensor $CS_{W1}$ and third contact sensor $CS_R$ are connected to the first bond pad 210a, and the second contact sensor $CS_{W2}$ and the third contact sensor $CS_R$ are connected to the second bond pad 210b.

Figure 10:
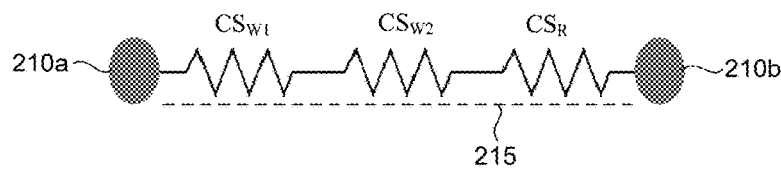
FIGS. 10-12 illustrate various interconnected contact sensor arrangements aligned relative to an air bearing surface of a magnetic recording head in accordance with various embodiments.
Figure 11:
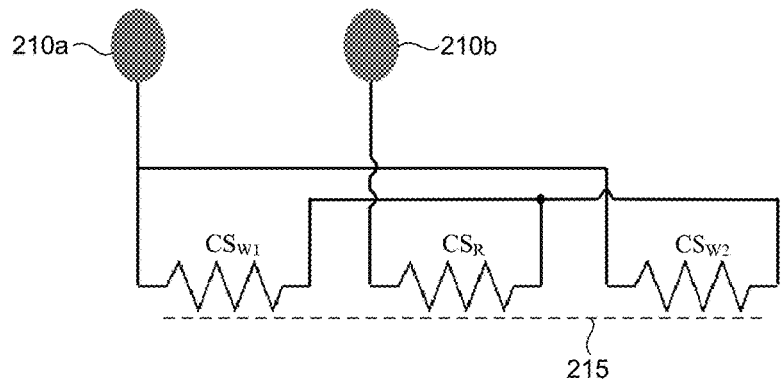
Figure 12:
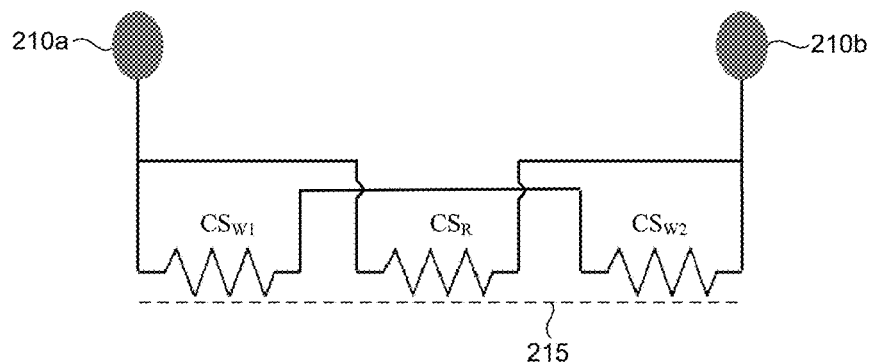

FIGS. 10-12 illustrate various interconnected contact sensor arrangements aligned relative to an air bearing surface 215 of a magnetic recording head in accordance with various embodiments. The contact sensor arrangement shown in FIG. 10 corresponds to that previously described with regard to FIG. 6. The contact sensor arrangement shown in FIG. 11 corresponds to that previously described with regard to FIG. 8. The contact sensor arrangement shown in FIG. 12 corresponds to that previously described with regard to FIG. 9. It is understood that the contact sensor arrangement shown in FIG. 7 can also be implemented at the air bearing surface 215 (not shown).

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising:
    a plurality of writers and at least one reader of a magnetic recording head, the plurality of writers and the reader defining a plurality of close points of the head;
    the plurality of writers spaced apart from one another in a cross-track direction and positioned in the same plane of the head; and
    a plurality of contact sensors positioned proximate the plurality of writers and the reader, the contact sensors coupled together and to a pair of electrical bond pads of the head and configured to sense for head-disk contact at each of the close points.

2. The apparatus of claim 1, wherein:
    at least one of the plurality of writers comprises a wide write pole;

at least one of the plurality of writers comprises a narrow write pole relative to wide write pole; and
the wide write pole and the narrow write pole are configured to implement interlaced magnetic recording.

3. The apparatus of claim 1, wherein the plurality of contact sensors comprises at least a writer contact sensor and a reader contact sensor.

4. The apparatus of claim 3, wherein the writer contact sensor is positioned substantially equidistant between the plurality of writers.

5. The apparatus of claim 3, wherein:
the writer contact sensor is positioned proximate a shield of each of the plurality of writers; and
the writer contact sensor is configured to sense for head-disk contact via a temperature change in the shield of each writer.

6. The apparatus of claim 3, wherein a center of the writer contact sensor is in down-track alignment with a center of the reader contact sensor.

7. The apparatus of claim 1, wherein the reader contact sensor is configured to sense head-disk contact and thermal asperities.

8. The apparatus of claim 1, wherein each of the contact sensors comprises a dual-ended temperature coefficient of resistance (DETCR) sensor.

9. The apparatus of claim 1, wherein each of the contact sensors is situated at or near an air bearing surface of the head.

10. An apparatus, comprising:
a slider configured to interact with a magnetic recording medium, the slider comprising a plurality of electrical bond pads;
a first writer disposed at a first close point of the slider;
a second writer disposed at a second close point of the slider, the first and second writers spaced apart from one another in a cross-track direction and positioned in the same plane of the slider;
a reader disposed at a third close point of the slider; and
three contact sensors each configured to sense contact between the slider and the medium;
wherein a first contact sensor is situated at or near the first close point of the first writer, the second contact sensor is situated at or near the second close point of the second writer, and the third contact sensor is situated at or near the third close point of the reader; and
the three contact sensors are coupled together and between a pair of the bond pads.

11. The apparatus of claim 10, wherein:
the first writer comprises a wide write pole;
the second writer comprises a narrow write pole relative to that of the first writer; and
the wide write pole and the narrow write pole are configured to implement interlaced magnetic recording.

12. The apparatus of claim 10, wherein the three contact sensors are spaced apart from one another in a cross-track direction and positioned in the same plane.

13. The apparatus of claim 10, wherein the third contact sensor is smaller in size than the first and second contact sensors.

14. The apparatus of claim 10, wherein the third contact sensor is configured to sense for slider-medium contact and thermal asperities.

15. The apparatus of claim 10, wherein the three contact sensors are coupled in series between the pair of bond pads.

16. The apparatus of claim 10, wherein the three contact sensors are coupled in parallel between pair of bond pads.

17. The apparatus of claim 10, wherein a first contact sensor is coupled in parallel to a second contact sensor, and the parallel-coupled first and second contact sensors are coupled in series with a third contact sensor.

18. The apparatus of claim 17, wherein:
the first contact sensor is disposed at or near the first close point of the first writer;
the second contact sensor is disposed at or near the second close point of the second writer; and
the third contact sensor is disposed at or near the third close point of the reader.

19. The apparatus of claim 10, wherein a first contact sensor is coupled in series to a second contact sensor, and the series-coupled first and second contact sensors are coupled in parallel with a third contact sensor.

20. The apparatus of claim 19, wherein:
the first contact sensor is disposed at or near the first close point of the first writer;
the second contact sensor is disposed at or near the second close point of the second writer; and
the third contact sensor is disposed at or near the third close point of the reader.

* * * * *